United States Patent [19]
Esteves

[11] 3,726,369
[45] Apr. 10, 1973

[54] AUTOMATIC BRAKE ACTUATOR

[76] Inventor: Joao De Assuncao Esteves, 1477 Pacific Avenue, San Leandro, Calif. 94577

[22] Filed: Jan. 14, 1971

[21] Appl. No.: 106,513

[52] U.S. Cl. ............................. 192/3 TR, 192/3 R
[51] Int. Cl. ........................................... F16d 67/00
[58] Field of Search ........................... 192/3 TR, 3 R

[56] References Cited

UNITED STATES PATENTS

| 2,266,213 | 12/1941 | Kattwinkel | 192/3 TR |
| 2,643,746 | 6/1953 | Righter | 192/3 TR |
| 3,513,953 | 5/1970 | Stevens | 192/3 TR |

Primary Examiner—Charles J. Myhre
Assistant Examiner—Randall Heald
Attorney—Joseph B. Gardner

[57] ABSTRACT

Brake actuator mechanism for energizing the brake system of an automotive vehicle automatically during the interval that the driver's foot is removed from the accelerator pedal and is placed on the brake pedal. Thus, the loss of time otherwise incident to movement of the driver's foot from the accelerator pedal to the brake pedal is obviated. The mechanism includes a brake-system actuator in the form of a solenoid connected with the brake pedal and operative, when energized, to displace the same inwardly, thereby causing the brakes to be applied. A sensor in the form of a switch is located on the accelerator pedal so that the switch is tripped whenever the driver's foot is removed from the pedal. Control means in the form of an electric circuit including the actuator and sensor as elements thereof is responsive to the sensor and effective to energize the actuator automatically whenever the driver's foot is released from the brake pedal.

7 Claims, 5 Drawing Figures

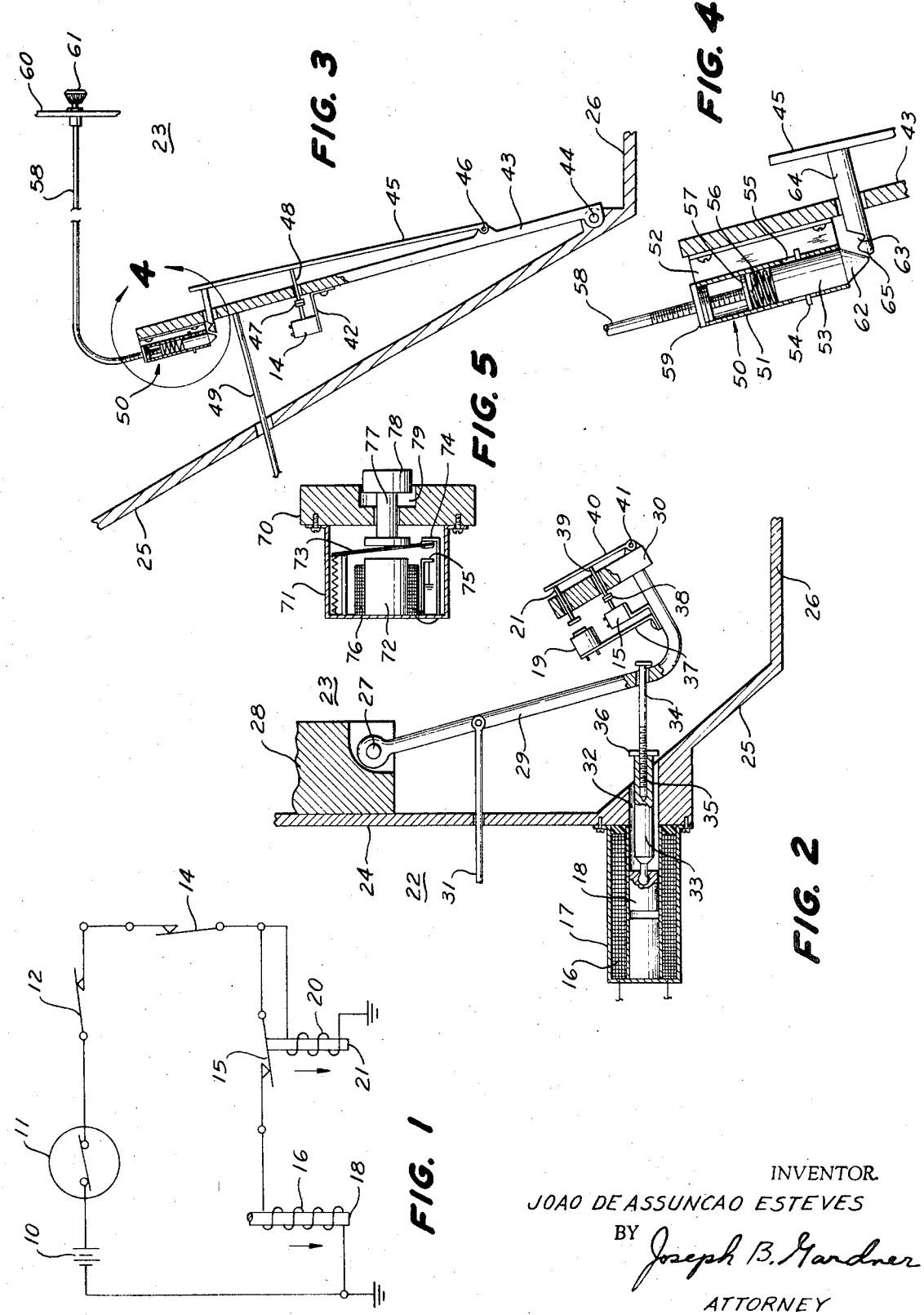

AUTOMATIC BRAKE ACTUATOR

This invention relates to automotive vehicles and, more particularly, to the brake systems therefor. More especially, the invention is concerned with a brake actuator mechanism operative to apply the vehicle brakes automatically whenever the driver's foot is removed from the accelerator pedal for the purpose of applying the vehicle brakes.

At the high velocities at which automotive vehicles now travel and because of the traffic congestion, it is becoming increasingly necessary for drivers to have quick reflexes so as to apply the vehicle brakes almost instantaneously if accidents, both major and minor, are to be averted. Frequently, increasing response time by a fraction of a second would have averted an accident, and while this is commonly understood, there is no practicable way in which to increase a driver's attention or to make his responses more rapid. While larger and more powerful braking systems are being employed in the more modern vehicles, such system improvements are not an answer to the attention and response characteristics of individual drivers.

One of the time delays confronting the driver of any vehicle in applying the brakes thereof when the necessity is imminent is that incident to the physical movement of the driver's foot from the accelerator pedal of the vehicle to the brake pedal thereof. No matter how rapid the driver's response to any condition requiring braking, there is nevertheless some delay or loss of time caused by the physical requirement to change the position of the driver's foot from the accelerator pedal to the brake pedal. One of the major objects of the present invention is to effectively eliminate the loss of time otherwise incident to such change in position of the driver's foot from the accelerator to the brake pedal, and the invention comprises brake actuator mechanism for accomplishing this purpose.

Additional objects, among others, of the present invention are in the provision of an improved brake actuator mechanism operative to apply the brakes of an automotive vehicle automatically, whenever the mechanism is in operation, upon quick or emergency release of the driver's foot from the accelerator system of the vehicle to permit such accelerator system to return to its idle condition; an improved brake actuator mechanism in which the function thereof is bypassed or interrupted as soon as the driver's foot depresses the brake pedal to control brake application; an improved mechanism which remains inoperative during the time interval that the driver's foot is transferred from the brake pedal of the vehicle to the accelerator pedal thereof; and an improved mechanism which can be made operative and inoperative, selectively, at the choice of the driver, and which contains adjustment features by means of which the response characteristics of the mechanism upon release of the accelerator pedal can be adjusted to the sensitivity desires of any particular driver of any vehicle.

Additional objects and advantages of the invention, especially as concerns particular features and characteristics thereof will become apparent as the specification continues.

Embodiments of the invention are illustrated in the accompanying drawing, in which:

FIG. 1 is a schematic circuit diagram illustrating the electrical components of the brake actuator mechanism in association with the electrical system of an automotive vehicle;

FIG. 2 is a broken vertical sectional view illustrating the actuator component of the mechanism in operative association with the brake pedal of a vehicle;

FIG. 3 is a broken side view in elevation, partly in section, of the accelerator pedal of a vehicle with the sensor component of the mechanism operatively associated with the accelerator pedal;

FIG. 4 is an enlarged side view in elevation of the adjustment element used in conjunction with the sensor, the view being taken along the line 4—4 of FIG. 3; and FIG. 5 is a broken sectional view illustrating a modified actuator in association with the brake pedal of an automotive vehicle.

The exemplary embodiment of the invention illustrated in the drawing and to be considered in detail herein is an electro mechanical arrangement including electrical switches and solenoids connected in circuit with the electrical system of an automotive vehicle. A typical interconnection of such components with the electrical system of a vehicle is illustrated in FIG. 1 which depicts the usual storage battery 10 having the negative terminal thereof grounded to the vehicle chassis, and the positive terminal connected to one side of the key-operated ignition switch 11 of the vehicle. In the position of the switch shown in FIG. 1, a circuit therethrough is completed from the battery 10 to one side of a manually operable switch 12 which is closed, as shown, whenever the brake actuator mechanism is to function, but can be opened manually by the driver of the vehicle whenever he desires to disable or make the mechanism inoperative.

Connected in series with the main on-off switch 12 is a sensor switch 14 associated with the accelerator system of the vehicle in a manner to be described hereinafter. The switch 14 is open whenever the accelerator system, or foot pedal associated therewith, is displaced abruptly from the normal idle position thereof to regulatively adjust the fuel supply to the vehicle engine and thereby control the operational velocity thereof. However, upon release of the accelerator system to permit it to return toward its idle position, the switch 14 is closed to complete the circuit therethrough. In series connection with the sensor switch 14 is an actuator switch 15 usually located on the brake pedal of the vehicle. The actuator switch 15 is normally closed so that a circuit therethrough can be completed whenever the sensor switch 14 is closed by removal of the driver's foot from the accelerator pedal. The actuator switch 15 is arranged in series connection with the energizing coil 16 of a solenoid 17 (FIG. 2) which forms the brake-system actuator operative to energize the brake system of the vehicle upon closure of the sensor switch 14. The movable plunger 18 of the solenoid 17 is connected with the brake pedal of the automotive vehicle so as to displace the same inwardly whenever the coil 16 is energized, thereby effecting the aforementioned energization of the vehicle braking system.

It is desirable to disable the brake actuator mechanism during the interval that the driver returns his foot to the accelerator pedal after releasing the brake pedal so that the mechanism does not function to reapply the brakes during this interval. The means by which such bypassing or disabling of the system is effected in the particular embodiment of the invention being considered essentially includes a relatively weak solenoid 19 (FIG. 2) having an energizing coil 20 and a plunger 21. It will be evident from FIG. 1 that the coil 20 is connected in series between ground and one side of the sensor switch 14 so that the coil is energized whenever the switch 14 is closed (assuming the master switch 12 and ignition switch 11 to be closed). The plunger 21 of the solenoid 19 is functionally connected with the movable contact of the switch 15 and, as described in detail hereinafter, the plunger, 21 is manually displaced whenever the brake pedal is depressed so as to open the switch 15 and thereby interrupt the energizing circuits through the coil 16 of the solenoid 17. The solenoid 19 forms a type of self-holding circuit which maintains the actuator switch 15 in its open condition until the sensor switch 14 is opened by inward displacement of the accelerator pedal.

It will be apparent that the overall brake actuator mechanism illustrated in FIG. 1 is connected with the electrical system of an automotive vehicle and is conditioned for operation whenever the master switch 12 is closed and the ignition switch 11 is on. In the usual state, the coils 16 and 20 of the respective solenoids 17 and 19 are de-energized, the actuator switch 15 associated with the brake pedal is closed, and the sensor switch 14 associated with the accelerator pedal is open. At this time, the vehicle brakes will be completely released and the vehicle will be moving (usually forwardly) with the driver's foot upon the accelerator pedal to displace the same inwardly from its idle position. Should it be necessary to apply the brakes of the vehicle, the driver releases the brake pedal whereupon the switch 14 immediately closes which completes circuits through the energizing coils 16 and 20 of the respective solenoids 17 and 19, thereby displacing the plunger 18 to energize the braking system of the vehicle. The rapidity of the electric response and mechanical movements characterized by the switch 14 and plunger 18 are essentially instantaneous and effect energization of the braking system well before the driver's foot ever approaches the brake pedal.

Once the driver's foot is placed on the brake pedal to depress the same, the plunger 21 is moved relative to the energizing coil 20 of the solenoid 19 into a position enabling the magnetic field developed by the coil 20 to retain the plunger 21 in its displaced position. As a consequence, the switch 15 is opened and the coil 16 de-energized which renders the brake actuator mechanism inoperative, thereby returning the entire braking function to the manual responses of the driver. The switch 15 remains open until the driver removes his foot from the brake pedal and returns it to the accelerator pedal to displace the same inwardly from its idle position which opens the switch 14 and thereby de-energizes the coil 20 of the solenoid 19. As a result of such de-energization, the switch 15 and plunger 21 return to their normal position to condition the mechanism for a subsequent cycle of operation.

As respects the present invention, the automotive vehicle with which the brake actuator mechanism is used may be completely conventional and no modification of the braking and acceleration systems thereof is required except for the minor connection of certain of the components of the actuator mechanism to these systems, as will now be described. As illustrated in FIG. 2, any such automotive vehicle usually has engine and occupant compartments 22 and 23 separated by an upwardly extending fire wall 24 which at its lower end may have an angularly disposed section 25 terminating in a generally horizontal floor board or bottom wall 26. Supported for pivotal displacements about a pin or axis 27 provided by a mounting block 28 carried by the fire wall 24 is the usual manually operable brake pedal that includes a shaft or lever 29 and a foot rest or pressure plate 30 that is ordinarily covered with an antislip material such as high friction rubber. The brake pedal is connected directly to the braking system of the vehicle which today is a hydraulic to other fluid system having a master cylinder (not shown) displacement of the piston of which expresses hydraulic fluid through the system conduits to cause the brake bands of the vehicle to frictionally engage the respective tire-equipped brake drums. Thus, a rod or shaft 31 may extend through the fire wall 24 and be pivotally connected at one end to the brake lever 29 and at its other end to the displaceable piston forming a part of the master cylinder of the vehicle braking system. Accordingly, the brake pedal 29,30 functions in the usual manner to apply the vehicle brakes when depressed and to release such brakes when force is removed from the pressure plate 30. Sufficient resilience is incorporated in the system to return the brake pedal to its outer inoperative position when manual force is removed from the pressure plate 30.

The casing of the solenoid 17 is rigidly secured to the fire wall 24 by any suitable means, such as the screws shown, and a bore or opening 32 is formed in the fire wall in alignment with the reciprocable plunger 18 of the solenoid. Linkage structure including an inner link 33 pivotally connected to the plunger 18 and an outer link 34 connected with the brake lever 29 couples the brake pedal and solenoid plunger so as to cause the pedal to be displaced inwardly with the plunger 18 whenever the solenoid 17 is energized. Advantageously, adjustment means are included in the linkage so as to enable the brake pedal to be adjusted with respect to the plunger 18 so that the desired degree of pedal displacement and braking action is applied when the solenoid is energized. In the linkage structure illustrated, the inner link 33 is a female component having a threaded socket 35 that receives therein the threaded inner end of the outer link 34. A lock nut 36 maintains the inner and outer links 34 in any position of adjustment.

It will be appreciated that if the outer link 34 is displaced inwardly to a greater extent in the socket 35, the brake pedal 29,30 will be displaced inwardly to a greater extent when the solenoid 17 is energized, thereby causing a greater braking force to be applied to the brakes of the vehicle via the shaft or rod 31. On the other hand, adjustment of the links 33 and 34 in opposite direction will diminish the magnitude of the braking force applied to the brakes of the vehicle when the solenoid 17 is energized. In most modern vehicles a power assist is interposed between the manually operable brake pedal 29,30 and master cylinder of the braking system so that very little manual force need be applied to the brake pedal to energize the braking system. In any case, however, the solenoid 17 can be selected so as to develop the required magnetic flux force to displace the brake pedal inwardly to operate the brake system whenever the battery circuit through the coil 16 of the solenoid is completed.

The switch 15 and solenoid 19 are located behind the pressure plate 30, and are each fixedly secured to a bracket 37 attached to the lever 29, such as by screw fasteners as illustrated. The switch 15 may be any conventional open-close switch (a limit switch, for example), and the actuator button 38 thereof is in alignment with adapted to be engaged by a pin 39 extending through an opening provided therefor in the pressure plate 30 and connected at its outer end to a lever 40 pivotally related to the plate 30 by an axle or pivot shaft 41. The pin 39 has an enlarged head at its inner end so as establish a firm contact with the button 38 of the switch 15. The spring force embodied in the switch 15 to hold the button 38 thereof outwardly is generally adequate to keep the lever 40 in the outer position illustrated relative to the plate 30 until the driver's foot is applied to the brake pedal, whereupon the lever 40 is pushed inwardly into engagement with the plate 30. As heretofore stated, the switch 15 is normally closed so that it is opened by inward displacement of the lever 40 upon manual application of the vehicles brakes.

The solenoid 19 is relatively weak, as heretofore stated, so that even when energized it does not produce sufficient magnetic flux to pull the plunger 21 thereof inwardly which would pull the lever 40 inwardly and thereby open the switch 15. However, when the lever 40 and plunger 21 are pushed inwardly by application of the driver's foot to the lever 40 and pressure plate 30, the solenoid 19 has sufficient strength to hold the plunger, lever 40, and pin 39 in their inner switch-opening positions. It will be apparent from FIG. 2 that the plunger 21 extends through an opening provided therefor in the pressure plate 30, and that at its outer end it is secured to the lever 40 so as to move therewith.

Referring to FIG. 3, the sensor switch 14 is mounted upon a bracket 42 secured to the underside of the accelerator pedal 43 which at its lower end is pivotally supported along the inclined section 25 of the fire wall by a pivot pin 44. Pivotally secured to the accelerator pedal 43 along the outer side thereof so as to be engaged by the driver's foot when applied to the accelerator pedal is a lever 45 pivotally attached at its lower end by a pin 46 to the accelerator pedal. The switch 14 may be a limit switch or other on-off switch, as in the case of the switch 15, and the actuator button 47 thereof is engaged by the enlarged inner end of a pin or plunger 48 secured at its outer end to the lever 45 and extending through an opening in the accelerator pedal 43. The switch 14 is a normally closed switch (i.e., closed when no force is applied to the actuator button 47) so that the switch is closed in the position of the accelerator pedal 43 illustrated in FIG. 3 which is the idle position of the accelerator. Accordingly, the circuit including the switches 14 and 15 would be in the condition illustrated in FIG. 1 in which the sensor switch 14 is closed because the accelerator pedal 43 is in its idle position and the actuator switch 15 is closed and the solenoid 14 energized, whereupon the brake pedal 29,30 is displaced inwardly as shown in FIG. 2 to energize the vehicle brakes.

The accelerator pedal 43 is associated with the usual accelerator lever or linkage system 49 that extends through an opening provided therefor in the section 25 of the fire wall 24 and is connected to the pedal 43. Thus, the spring force biasing the accelerator system and pedal 43 toward the idle position is operative against the pedal. Thus, the accelerator system of the vehicle functions in the same manner as the system of any standard vehicle. An adjustment means or sensitivity control generally denoted with the numeral 50 is associated with the accelerator pedal 43 and lever 45 supported thereon, and such adjustment means permits the sensitivity of the brake actuator mechanism to be adjusted or taylored to the desires of any particular driver operating the automotive vehicle.

The adjustment means 50 includes a cylinder or hollow shell 51 rigidly secured to the undersurface of the pedal 43 by means of a bracket 52 attached thereto as by means of screw fasteners. Supported within the hollow interior of the cylinder 51 is a reciprocable plunger 53 having an abutment or stop pin 54 extending therethrough and projecting outwardly through elongated slots 55 provided by the cylinder 51. Accordingly, the maximum extent of the inward and outward displacements of the plunger 53 within the cylinder 51 is determined by abutment of the stop pin 54 with the opposite ends of the slots 55. The plunger 53 is resiliently biased toward the outer position shown by a helical compression spring 56 which at one end seats upon the plunger 53 and at its opposite end seats against a washer 57 mounted upon and rotatable with respect to the inner end of a flexible shaft 58 that is threaded adjacent such end and threadedly engages a nut 59 fixedly secured to the cylinder 51 so as to prevent relative rotation therebetween.

The outer end of the flexible shaft 58 extends through the dash or panel 60 in the occupants compartment 23 of the automotive vehicle, and is freely rotatable with respect to such panel. The shaft 58 is provided at its outer end with a knob 61 adapted to be gripped by the fingers to enable the shaft 58 to be rotated relative to the nut 59. It will be apparent that rotation of the knob 61 and shaft 58 in one direction relative to the nut 59 will compress the spring 56 to a greater extent, thereby increasing the magnitude of the biasing force applied to the plunger 53 whereas rotation of the shaft in the opposite direction will diminish the magnitude of the spring force, thereby reducing the biasing force applied to the plunger.

The exposed outer end of the plunger 53 has a generally cone-shaped configuration as shown at 62, and such pointed or cone-shaped end is adapted to seat within a complementary V-shaped recess 63 formed in a pin 64 extending through an opening provided therefor in the accelerator pedal 43 and secured to the lever 45 so as to move therewith. When the driver's foot is applied against the lever 45 and accelerator pedal 43 to displace the same, the pin 64 moves inwardly relative to the accelerator pedal 43, bracket 52, and plunger 53, thereby displacing the plunger upwardly against the biasing force of the spring 56 to seat the pointed lower end 62 of the plunger in the recess 63. Such upward displacement of the plunger 53 relative to the pin 64 is facilitated by the inclined or cam-shaped inner edge 65 of the pin 64.

Ordinarily, as the driver depresses the lever 45 and accelerator pedal 43 to maintain the vehicle in motion, the lower end 62 of the plunger 53 is seated within the recess 63 which tends to maintain the lever 45 in an inward position in substantial juxtaposition with the outer surface of the accelerator pedal 43. As a consequence, the pin 48 has displaced the switch button 47 inwardly to open the switch 14. When the driver releases the accelerator slowly, the pedal 43 returns to the idle position thereof because of the spring force operative upon the linkage 49 all in a completely conventional manner. The lever 45 will not move outwardly relative to the pedal 43, however, because the biasing force applied by the spring 56 to the plunger 53 holds the pin 64 and lever 45 inwardly. On the other hand, if the accelerator is released suddenly, the pointed lower end 62 of the plunger will ride over the cammed end 65 of the pin 64 and permit the lever 45 to be displaced outwardly by the spring within the switch 14, whereby the lever and pedal assume the relative positions illustrated in FIGS. 3 and 4 and the switch 14 closes.

This sensitivity control introduces a predetermined response characteristic into the brake actuator mechanism which tends to maintain the mechanism in an inoperative state when the driver slowly relaxes or reduces the magnitude of the force being applied to the accelerator pedal in accordance with the changes in vehicle velocity dictated by the traffic conditions. On the other hand, whenever the driver suddenly releases the accelerator pedal as when removing his foot therefrom to apply it to the brake pedal, the consequent rapid return of the accelerator pedal 43 and lever 45 to their idle positions will cause the plunger 53 to be released, whereupon the lever 45 will move outwardly relative to the pedal 43 to close the switch 14 and thereby permit operation of the brake actuator mechanism. It will be appreciated that the degree of sensitivity introduced by the mechanism 50 can be changed and adjusted by varying the compression of the spring 56 and, therefore, the biasing force applied thereby against the plunger 53.

A slightly modified and preferred switch and solenoid arrangement for the actuator associated with the brake pedal of a vehicle is illustrated in FIG. 5, and essentially it combines in a more compact structural form of the switch 15 and solenoid 19 illustrated in FIG. 2. Only a part of the brake pedal is shown in FIG. 5 and such part comprises the pressure plate which is designated with the numeral 70. The casing of a solenoid and switch assembly 71 is fixedly secured to the underside of the pedal 70, and such assembly includes a solenoid 72 and a movable switch contact 73 displaceable between the position shown in FIG. 5 in which it is in engagement with a fixed terminal 74 and an alternate position (not shown) in which it is in engagement with a fixed terminal 75 that is connected to ground. One side of the solenoid coil 76 is grounded through the terminal 75, and the other side thereof is connected in common with the movable contact 73 to the sensor switch 14, as in the case of the switch 15 and energizing coil 20 heretofore described. The plunger 77 associated with the solenoid 72 extends through an opening therefor in the pressure plate 70, and the plunger has an enlarged head adapted to engage the movable contact 73. The outer end of the plunger 77 is connected with the lever 78 adapted to seat within a recess 79 provided for this purpose in the pressure plate 70. The contact 73, plunger 77, and lever 78 are ordinarily biased into the outer positions shown in FIG. 5 by the biasing springs (not shown) associated with the movable contact 73. Additional spring force may be introduced into the system should it be advantageous to do so in any particular embodiment of the invention.

The assembly 71 functions in precisely the same manner as the switch 15 and solenoid 19 heretofore described. Accordingly, the contact 73 is usually in engagement with the fixed contact 74 so as to complete a circuit through the energizing coil 16 of the solenoid 17 whenever the sensor switch 14 is closed. However, when the driver applies a braking force to the pressure plate 70, the lever 78 is displaced inwardly whereupon the plunger 77 engages the contact 73 to displace it into engagement with the fixed grounded terminal 75. At this time, the plunger 77 is sufficiently close to the solenoid 72 so that the magnetic flux developed thereby is adequate to maintain the plunger in this position so that the actuator switch defined by the contact 73 and terminal 74 is open and the solenoid 17 de-energized. This condition is then maintained after the driver removes his foot from the pressure plate 70 until the sensor switch 14 has been opened by application of the driver's foot to the accelerator pedal 43 and lever 45 lying therealong.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is: position;

1. Brake actuator mechanism for an automotive vehicle having a brake system and also an accelerator system displaceable from an idle position to regulatively adjust the fuel supply to the vehicle engine and thereby control the operational velocity thereof, comprising: a normally inoperative brake-system actuator connectable with such brake system and effective when made operative to energize the same and thereby cause the vehicle brakes to be applied; a sensor adapted to be associated with such accelerator system so as to be actuated by return movement thereof from an operational position toward its idle position; control means responsive to said sensor and effective to make actuator operative to apply the vehicle brakes whenever said sensor is actuated by such return movement of the accelerator system; and sensitivity means operatively arranged with said sensor to determine the sensitivity thereof to the character of the return movement of such accelerator system to enable said sensor to discriminate automatically between sudden and gradual return movements thereof, said sensor being actuated by sudden return movements of the accelerator system but not by gradual return movements thereof so that said actuator is made operative to apply the vehicle brakes in the first but not the latter instance.

2. The actuator mechanism of claim 1 and further including adjustment structure forming a part of said sensitivity means and permitting selective adjustment of response characteristics of said sensor to return movements of such accelerator system.

3. Brake actuator mechanism for an automotive vehicle having a brake system and having also an accelerator system equipped with an actuator displaceable from an idle position to regulatively adjust the fuel supply to the vehicle engine and thereby control the operational velocity thereof, comprising: a normally inoperative brake-system actuator connectable with such brake system and effective when made operative to energize the same and thereby cause the vehicle brakes to be applied; a sensor adapted to be associated with such accelerator-system actuator so as to be actuated by return movement thereof of predetermined character from an operational position toward its idle position; control means responsive to said sensor and effective to make said brake-system actuator operative to apply the vehicle brakes whenever said sensor is actuated by such return movement of the accelerator-system actuator; master selector switch means forming a part of said control means to enable said brake actuator mechanism to be made semipermanently inoperative at the election of the driver of such vehicle; and disabling means forming a part of said control means and being adapted to be associated with such brake-system actuator, said disabling means being effective automatically to make said control means momentarily inoperative to apply the vehicle brakes in the interval immediately following release of such brake system and prior to depressing said accelerator-system actuator.

4. The mechanism of claim 3 and further comprising sensitivity means operatively arranged with said sensor to determine the sensitivity thereof to the character of the return movement of said accelerator system to enable said sensor to discriminate automatically between sudden and gradual return movements thereof, said sensor being actuated by sudden return movements of the accelerator system but not by gradual return movements thereof so that said actuator is made operative to apply the vehicle brakes in the first but not the latter instance.

5. Brake actuator mechanism for an automotive vehicle having a brake system and also having an accelerator system displaceable from an idle position to regulatively adjust the fuel supply to the vehicle engine and thereby control the operational velocity thereof, comprising: a normally inoperative brake-system actuator connectable with such brake system and effective when made operative to energize the same and thereby cause the vehicle brakes to be applied; a sensor adapted to be associated with such accelerator system so as to be actuated by return movement thereof from an operational position towards its idle position, control means responsive to said sensor and effective to make said actuator operative to apply the vehicle brakes whenever said sensor is actuated by such return movement of the accelerator system; sensitivity means operatively arranged with said sensor to determine the sensitivity thereof to the character of the return movement of such accelerator system to enable said sensor to discriminate between sudden and gradual return movements thereof, said sensor being actuated by sudden return movements of the accelerator system but not by gradual return movements thereof; and disabling means forming a part of said control means and being effective to make said actuator inoperative to apply the vehicle brakes immediately following release of such brake system; said brake-system actuator comprising a solenoid, said sensor comprising an electric switch, and said control means comprising an electric circuit adapted to derive power from the electrical system of such automotive vehicle.

6. The mechanism of claim 5 in combination with an automotive vehicle in which the brake system includes a foot-depressible brake pedal adapted to be displaced inwardly to energize such brake system, in which such accelerator system includes a foot-depressible accelerator pedal displaceable inwardly from the idle position thereof, and in which said actuator and sensor are respectively connected with said brake and accelerator pedals.

7. The mechanism of claim 6 and further including adjustment structure forming a part of said sensitivity means and permitting selective adjustment of response characteristics of said sensor to return movements of such accelerator system, and further including adjustment means operatively connected with said brake-system actuator to determine the extent to which the vehicle brakes are applied upon operation of said actuator.

* * * * *